US010097475B2

(12) United States Patent
Mildh et al.

(10) Patent No.: US 10,097,475 B2
(45) Date of Patent: Oct. 9, 2018

(54) METHODS, NETWORK NODE, SYSTEMS, AND COMPUTER PROGRAM PRODUCTS FOR CONTROLLING USAGE OF MULTI-PATH TCP

(71) Applicant: Telefonaktiebolagbet L M Ericsson (publ), Stockholm (SE)

(72) Inventors: Gunnar Mildh, Sollentuna (SE); Jari Vikberg, Jarna (SE); Tomas Hedberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 475 days.

(21) Appl. No.: 14/220,570

(22) Filed: Mar. 20, 2014

(65) Prior Publication Data

US 2015/0215225 A1 Jul. 30, 2015

Related U.S. Application Data

(60) Provisional application No. 61/931,220, filed on Jan. 24, 2014.

(51) Int. Cl.
*H04L 12/891* (2013.01)
*H04L 12/707* (2013.01)
*H04L 29/06* (2006.01)
*H04L 12/825* (2013.01)

(52) U.S. Cl.
CPC .............. *H04L 47/41* (2013.01); *H04L 45/24* (2013.01); *H04L 47/263* (2013.01); *H04L 69/14* (2013.01)

(58) Field of Classification Search
CPC .......... H04L 45/24; H04L 47/41; H04L 69/14
See application file for complete search history.

(56) References Cited

U.S. PATENT DOCUMENTS

| 6,532,212 B1 * | 3/2003 | Soloway | H04L 45/00 370/230 |
| 7,583,677 B1 * | 9/2009 | Ma | H04L 45/00 370/235 |
| 2005/0160473 A1 * | 7/2005 | Gal-Oz | H04N 7/165 725/118 |
| 2008/0267216 A1 | 10/2008 | Vergnaud | |

(Continued)

FOREIGN PATENT DOCUMENTS

EP    2538637 A2 * 12/2012   ............. H04L 69/14

OTHER PUBLICATIONS

Paasch, Christopher et al., Exploring Mobile/WiFi Handover with Multipath TCP, Aug. 13, 2012, CellNet' 12, pp. 1-6.*

(Continued)

*Primary Examiner* — Noel R Beharry
*Assistant Examiner* — Rodrick Mak
(74) *Attorney, Agent, or Firm* — Rothwell, Figg, Ernst & Manbeck, p.c.

(57) ABSTRACT

A method performed by a multi-path transmission control protocol (MPTCP) controller of a MPTCP capable device. The method includes receiving, from outside of the device, information signals comprising MPTCP usage information. The method also includes sending control signals to an MPTCP scheduler of the device for controlling the scheduler. The control signals are based on the received usage information. Devices for performing the method are also described.

23 Claims, 8 Drawing Sheets

(56) References Cited

U.S. PATENT DOCUMENTS

| | | | |
|---|---|---|---|
| 2009/0046717 A1* | 2/2009 | Li | H04L 69/16 370/392 |
| 2009/0285201 A1* | 11/2009 | Ben-Haim | H04L 12/66 370/352 |
| 2011/0026414 A1 | 2/2011 | Banerjee | |
| 2011/0261715 A1* | 10/2011 | Norefors | H04W 60/00 370/252 |
| 2011/0296006 A1* | 12/2011 | Krishnaswamy | H04L 29/12952 709/224 |
| 2012/0099601 A1* | 4/2012 | Haddad | H04L 29/12405 370/401 |
| 2012/0143939 A1* | 6/2012 | Kang | H04W 8/26 709/201 |
| 2012/0226802 A1 | 9/2012 | Wu et al. | |
| 2012/0230236 A1* | 9/2012 | Kert | H04M 1/2535 370/311 |
| 2013/0021968 A1* | 1/2013 | Reznik | H04W 36/026 370/328 |
| 2013/0060962 A1* | 3/2013 | Wang | H04L 67/327 709/238 |
| 2013/0077501 A1* | 3/2013 | Krishnaswamy | H04L 47/193 370/252 |
| 2013/0111038 A1* | 5/2013 | Girard | H04L 69/16 709/226 |
| 2013/0308597 A1* | 11/2013 | Murphy | H04L 12/4633 370/331 |
| 2014/0254379 A1* | 9/2014 | Sampath | H04N 21/643 370/235 |
| 2014/0293959 A1* | 10/2014 | Singh | H04W 36/0016 370/331 |
| 2014/0351447 A1* | 11/2014 | Annamalaisami | H04L 65/1069 709/227 |
| 2014/0362765 A1* | 12/2014 | Biswas | H04W 76/026 370/328 |
| 2015/0201046 A1* | 7/2015 | Biswas | H04L 69/321 370/329 |
| 2016/0212759 A1* | 7/2016 | Schliwa-Bertling | H04L 69/14 |

OTHER PUBLICATIONS

Wischik, D., et al. "Design implementation and evaluation of congestion control for multipath TCP", Proceedings of USENIX NSDI, 2011, pp. 1-14, XP055045890.

International Search Report and Written Opinion dated Oct. 7, 2014 in corresponding International application No. PCT/EP2014/055559, 11 pages.

Mexican Office Action dated Feb. 23, 2018 issued in Mexican Patent Application No. 14860. (6 pages).

* cited by examiner

METHODS, NETWORK NODE, SYSTEMS, AND COMPUTER PROGRAM PRODUCTS FOR CONTROLLING USAGE OF MULTI-PATH TCP

CROSS-REFERENCE TO RELATED APPLICATIONS

This application claims the benefit of provisional patent application No. 61/931,220, filed on Jan. 24, 2014, the which is incorporated by reference herein in its entirety.

TECHNICAL FIELD

The present disclosure relates to methods and devices for controlling a scheduler in a multi-path transmission control protocol (MPTCP) capable device.

BACKGROUND

MPTCP Background

Many hosts today are multi-homed. Hence, they have multiple paths for connectivity via one or more access technologies. Regular Transmission Control Protocol (TCP)/Internet Protocol (IP) communications restrict these multi-homed hosts to use only one of the available interfaces/paths per session, where a path is defined as an (source, destination) IP address pair. The Internet Engineering Task Force (IETF) is currently looking into a mechanism which uses multiple paths between the communicating peers simultaneously during a communication session. Request for Comments (RFC) 6824 proposes a set of extensions to traditional TCP for multipath operations when multiple addresses are available. This is referred to as 'Multipath TCP' (MPTCP).

Advantages of using multiple paths concurrently are: i) improved network resource utilization (e.g., increased bandwidth due to resource pooling); ii) improved user experience through higher throughput; iii) allows failover from one interface to another (e.g., mobile client); and iv) allows a single data connection to use several interfaces simultaneously. A usage scenario for MPTCP is illustrated in FIG. 1.

Figure 1:
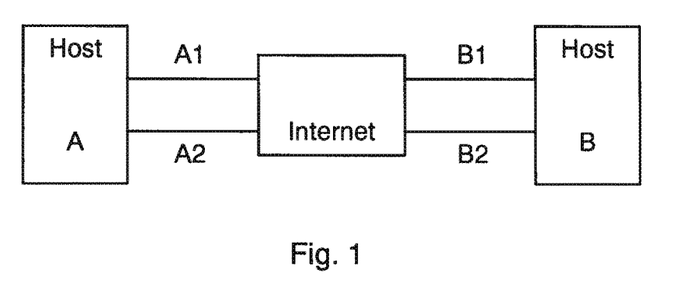
FIG. 1 illustrates two multi-homed hosts.

As shown in FIG. 1, two communicating hosts, host A and host B, are multi-homed and multi-addressed. Each host provides two separate connections to the Internet offering four different paths between them (A1-B1, A1-B2, A2-B1 and A2-B2).

A traditional TCP connection between the hosts A and B will make use of only one of the available paths whereas MPTCP connection makes use of all the four available paths between hosts A and B. An "MPTCP connection" is similar to a regular TCP connection and is defined in RFC 6824 as: "a set of one or more subflows, over which an application can communicate between two hosts". A subflow is defined in RFC 6824 as: "A flow of TCP segments operating over an individual path, which forms part of a larger MPTCP connection". A subflow is started and terminated similar to a regular TCP connection.

MPTCP is an end-to-end protocol which requires both hosts to support MPTCP (i.e., it requires both hosts to have an MPTCP protocol stack that includes an MPTCP protocol layer on top of one or more TCP/IP stacks) to benefit from MPTCP. Since, MPTCP is still in its early stage of deployment, probabilities that every host on the Internet supports MPTCP are very low. To overcome this problem and benefit from MPTCP even though both communicating hosts do not support MPTCP, an MPTCP proxy (a proxy server) may be used to convert MPTCP flows to TCP and vice versa.

Figure 2:
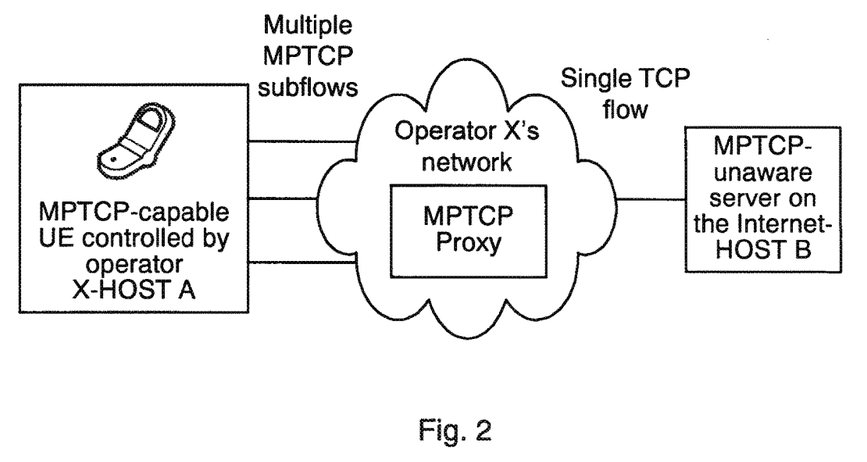
FIG. 2 illustrates the use of an MPTCP proxy.

One use case is illustrated in FIG. 2.

An MPTCP-capable user equipment (UE, Host A) is controlled by the operator and sets up several MPTCP subflows to the MPTCP proxy placed in the telecommunications operator's network. This proxy in turn sets up a single TCP flow to a server on the Internet (Host B) which is not MPTCP capable. In the described scenario, the UE which supports MPTCP can still get the benefits of MPTCP although the server at the other end is not aware of MPTCP. It may be noted that a proxy may be used even if both end-points (i.e. also the server in this case) are MPTCP capable and MPTCP is run on both sides of the proxy.

So the main principle of Multi-Path TCP (MPTCP) is to aggregate a set of TCP connections, for example over different wireless interfaces such as in accordance with a third generation partnership project (3GPP) communication standard and a wireless local area network (WLAN, e.g. Wi-Fi) communication standard (or even different simultaneous 3GPP accesses). MPTCP has one main flow and multiple subflows and is capable of distributing load on all interfaces. As the multiplexing of different connections is on TCP level, it allows separate congestion control for each subflow.

Figure 3:
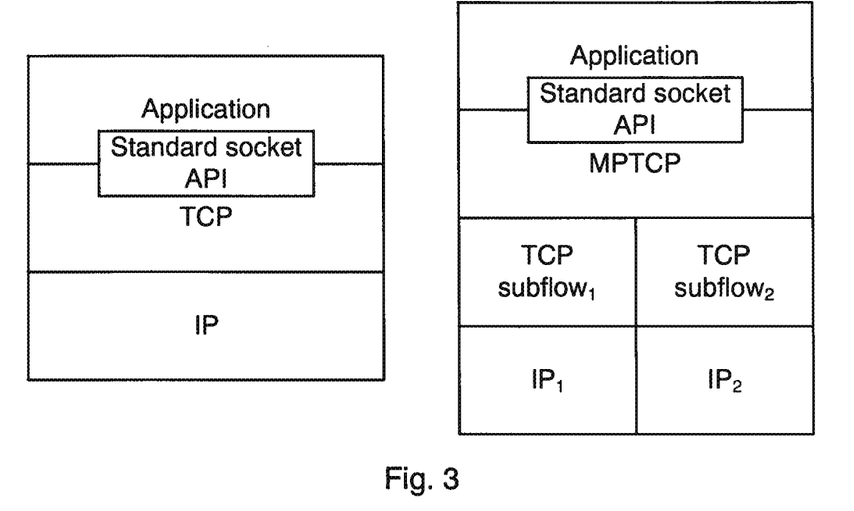
FIG. 3 illustrates a TCP/IP protocol stack and an MPTCP protocol stack.

FIG. 3 shows the differences between standard TCP and MPTCP protocol stacks. The application interface i.e. the socket application programming interface (API) is unchanged and the main changes are between this API and the IP-layer.

Figure 4:
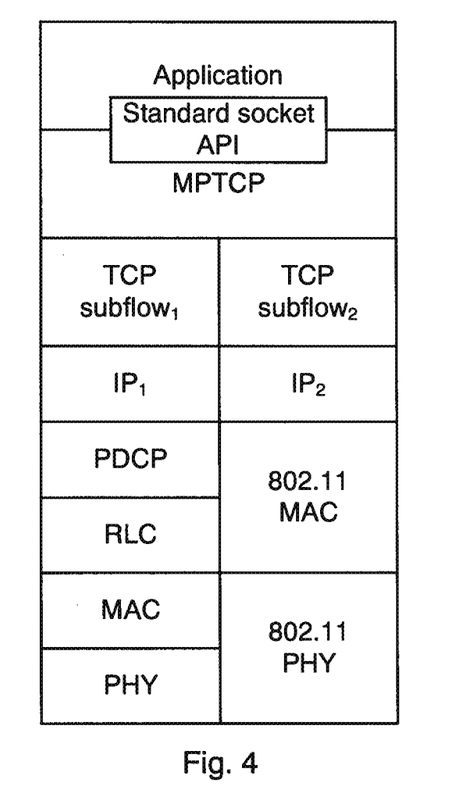
FIG. 4 illustrates an example MPTCP protocol stack.

MPTCP provides the possibility to fully and maximally utilize the different TCP subflows. For example, in the case of one TCP subflow on a 3GPP access and another one on Wi-Fi access, the total throughput could be the sum of these subflows. FIG. 4 shows an user plane protocol architecture example for the case when MPTCP would be utilizing a 3GPP long term evolution (LTE) communication standard and WLAN/Wi-Fi simultaneously.

Figure 5:
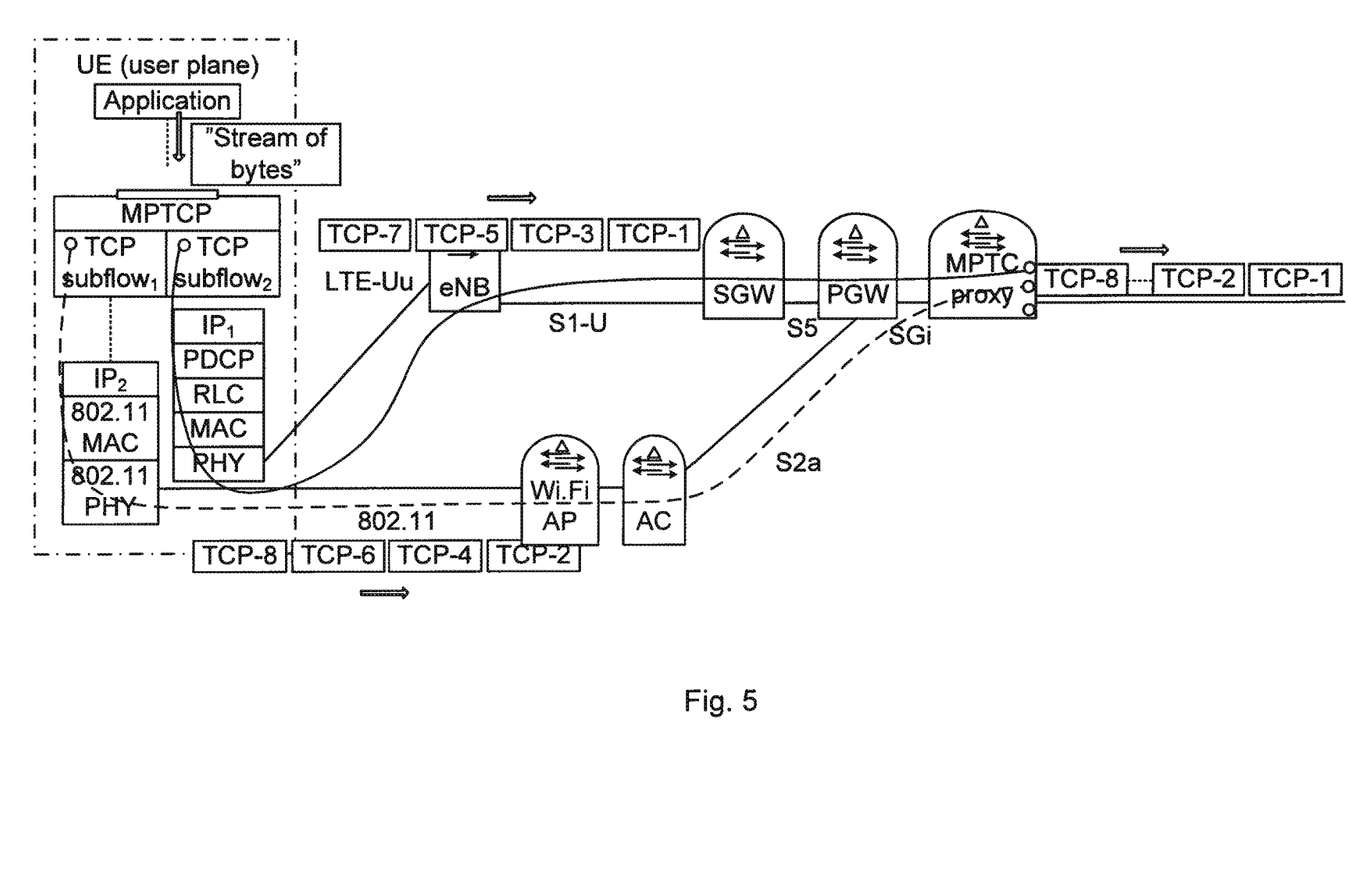
FIG. 5 illustrates MPTCP in action.

FIG. 5 shows an exemplary case of MPTCP in action when the UE is simultaneously connected to both LTE and Wi-Fi/WLAN. The application in the UE has opened up one TCP socket and is sending a stream of bytes on the internal API. The MPTCP layer (also called MPTCP scheduler) has established two different TCP subflows, subflow 1 via WLAN/Wi-Fi (the curved dashed line) and subflow 2 via LTE (the curved solid line). Both these subflows are in this example towards a MPTCP Proxy that further communicates with another server using plain TCP (shown as a TCP connection to the far right in the figure). The MPTCP scheduler is the function that decides how the different packets are mapped to the two subflows. In this example, the MPTCP scheduler is applying "round-robin" scheduling i.e. a first TCP segment is sent on subflow 2, a second on subflow 1, a third again on subflow 2 etc. Another example is that MPTCP scheduler uses the subflow with the shortest round-trip time (RTT). Such an approach is typically used in today's MPTCP kernel prototype implementations.

ANDSF Background

Figure 6:
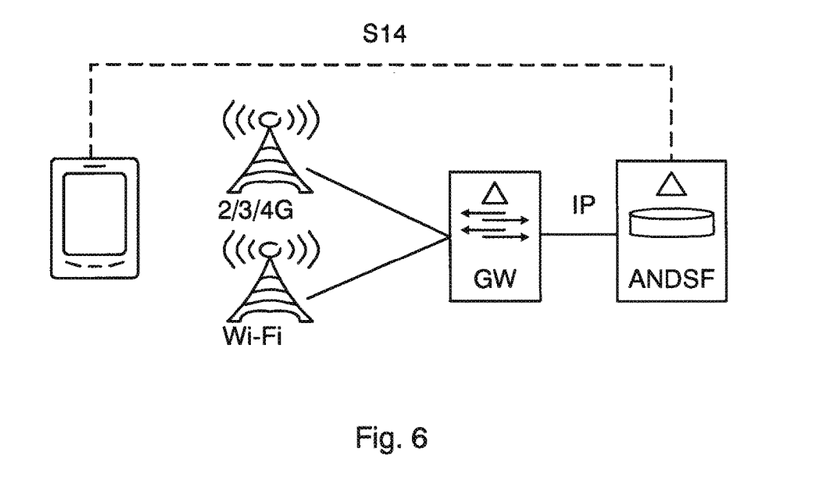
FIG. 6 illustrates a principle of ANDSF.

The Access Network Discovery and Selection Function (ANDSF) is a 3GPP defined function (since 3GPP Release 8 (Rel-8) and continues to evolve) and provides the possibility to send different policies to the UE for network discovery and selection (see FIG. 6). The communication between the UE and the ANDSF server is defined as an IP-based S14-interface.

Access Network Discovery Information (ANDI) is used to provide access discovery information to the UE, which can assist the UE to discover available (3GPP and) non-3GPP access networks without the burden of continuous background scanning.

Inter-System Mobility Policies (ISMP) are policies which guide the UE to select the most preferable 3GPP or non-3GPP access. The ISMP are used for UEs that access a single access (3GPP or Wi-Fi) at a time.

Inter-System Routing Policies (ISRP) are policies which guide the UE to select over which access a certain type of traffic or a certain access point name (APN) shall be routed. The ISRP are used for UEs that access both 3GPP and Wi-Fi simultaneously. Application specific ISRP policies have introduced the concept of the operating system (OS) specific Application Identifier (OSAppId), which is an identifier associated with a given application and uniquely identifying the application within the UE for a given operating system (as part of the Data Identification in Access Network Discovery and Selection Function (ANDSF) (DIDA) work).

The above ANDI, ISMP and ISRP have been extended with additional policies in the later 3GPP releases, for example WLAN selection policy (WLAN SP) and Inter-APN Routing Policies (IARP) policies.

SUMMARY

The current MPTCP implementations available in devices (e.g., end user devices (e.g. UE), servers, and other devices) only utilize the "seamless session continuity at mobility" benefit of MPTCP, i.e. throughput aggregation is not used. The main reason for this is the fact that WLAN access is currently seen as a cheaper access compared to 3GPP accesses and therefore a preference for using WLAN/Wi-Fi (a.k.a., the "use Wi-Fi if available" preference) is currently also used in the context of MPTCP.

There are known issues in enabling the throughput aggregation mode in MPTCP. The first issue is the one discussed above about different charging on Wi-Fi and 3GPP accesses. Another issue is related to possible regulatory aspects of splitting traffic over multiple accesses, for example Legal/Lawful Intercept becomes more complicated to support when the traffic from one application towards a server is split over multiple access networks.

Another issue is related to the use of zero-rating of certain services. In zero-rating the packets of a service flow belonging to a certain service is not charged at all. Example of zero-rating could be when the operator provides free access to a specific web-portal. In order to enable zero-rating, the network needs to detect that this specific portal is being accessed, which may in many cases require that all packets of this service goes through the same network.

It is assumed that these hurdles will be solved by for example harmonized charging between 3GPP and Wi-Fi, and by placement of an MPTCP-proxy in the mobile operator's network.

A problem solved by this disclosure is how the usage of MPTCP can be controlled for different applications, since there currently doesn't exist any method for this. This control can be based on different types of subscriptions, and different dynamic conditions in the network such as network load in different areas of the network and subscription based information such as remaining bucket (e.g. monthly data allowance). Different applications may also require different types of MPTCP usage and this may even evolve over time, for example an application initially starts using only the "seamless session continuity at mobility" benefit of MPTCP and later moves into using the "throughput aggregation" mode. This means that it would be beneficial to provide a dynamic control of the usage of MPTCP. This control may be either on UE level or on UE and application level.

According to an aspect of the present disclosure, there is provided a method performed by an MPTCP controller of an MPTCP capable device. The method comprises receiving information signals comprising MPTCP usage information, from outside of the device. The method also comprises sending control signals to an MPTCP scheduler of the device for controlling said scheduler, the control signals being based on the received usage information.

According to another aspect of the present disclosure, there is provided an MPTCP controller for an MPTCP capable device. The controller comprises processor circuitry, and a storage unit storing instructions executable by said processor circuitry, whereby said controller is operative to receive information signals comprising MPTCP usage information, from outside of the device. The controller is also operative to send control signals to an MPTCP scheduler of the device for controlling said scheduler, the control signals being based on the received usage information.

According to another aspect of the present disclosure, there is provided a UE comprising an embodiment of an MPTCP controller in accordance with the present disclosure, and an MPTCP scheduler.

According to another aspect of the present disclosure, there is provided an MPTCP proxy comprising an embodiment of an MPTCP controller in accordance with the present disclosure, and an MPTCP scheduler.

According to another aspect of the present disclosure, there is provided an application server comprising an embodiment of an MPTCP controller in accordance with the present disclosure, and an MPTCP scheduler.

According to another aspect of the present disclosure, there is provided a computer program comprising computer program code which is able to, when run on processor circuitry of an MPTCP controller of an MPTCP capable device, cause the controller to receive information signals comprising MPTCP usage information, from outside of the device. The code is also able to cause the controller to send control signals to an MPTCP scheduler of the device for controlling said scheduler, the control signals being based on the received usage information.

According to another aspect of the present disclosure, there is provided a method performed by a network element in a communication network. The method comprises obtaining MPTCP usage information for an MPTCP controller of an MPTCP capable device. The method also comprises transmitting information signals comprising the MPTCP usage information to the MPTCP capable device for enabling said MPTCP controller to control an MPTCP scheduler of the MPTCP capable device based on the MPTCP usage information.

According to another aspect of the present disclosure, there is provided a network element for a communication network. The element comprises processor circuitry, and a storage unit storing instructions executable by said processor circuitry whereby said network element is operative to obtain MPTCP usage information for an MPTCP controller of an MPTCP capable device. The element is also operative to transmit information signals comprising the MPTCP usage information to the MPTCP capable device for enabling said MPTCP controller to control an MPTCP scheduler of the MPTCP capable device based on the MPTCP usage information.

According to another aspect of the present disclosure, there is provided a computer program product comprising computer-executable components for causing an MPTCP controller to perform an embodiment of a method performed by an MPTCP controller, of the present disclosure, when the computer-executable components are run on processor circuitry of the controller.

According to another aspect of the present disclosure, there is provided a computer program product comprising an embodiment of a computer program according the present disclosure and a computer readable means on which the computer program is stored.

It is an advantage of embodiments of the present disclosure that (e.g. external) MPTCP usage information is received, based on which the scheduler can be controlled by the controller. The present disclosure provides a way to dynamically control how MPTCP is used by, for example different applications, end user devices, servers, etc. With respect to controlling the usage of MPTCP by end user devices (e.g. UE), the control may be from the network side towards the end user device, or between the end user device and another device (also called peer) supporting MPTCP. Likewise, controlling how a server (e.g., proxy server or other server) uses MPTCP may be from the network side or from a peer. The control can be applied to ongoing MPTCP sessions as well as future MPTCP sessions. In the latter case, the control could be in the form of policies, included in the MPTCP usage information, which instruct the other on how different services (also called applications) should use MPTCP.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

This disclosure provides a way to dynamically control usage of MPTCP. The control may be from the network side, or between an MPTCP device (e.g., MPTCP application or proxy server, MPTCP end user device/UE, etc.) and a peer supporting MPTCP (i.e., an MPTCP peer). In some embodiments, an MPTCP Controller is provided to control the usage of MPTCP by an MPTCP device (e.g., how one, some or all MPTCP applications running on the MPTCP device utilize MPTCP). The MPTCP Controller receives information about how MPTCP is to be used by the MPTCP device as a whole and/or by one or more MPTCP applications running on the MPTCP device. The information signaled towards the MPTCP Controller is herein called "MPTCP usage information" (described herein). Different ways to signal towards the MPTCP Controller are also described herein. Further, it is herein described how different applications may be identified. An MPTCP device is sometimes referred to as an "MPTCP endpoint."

The MPTCP Controller

Figure 7:
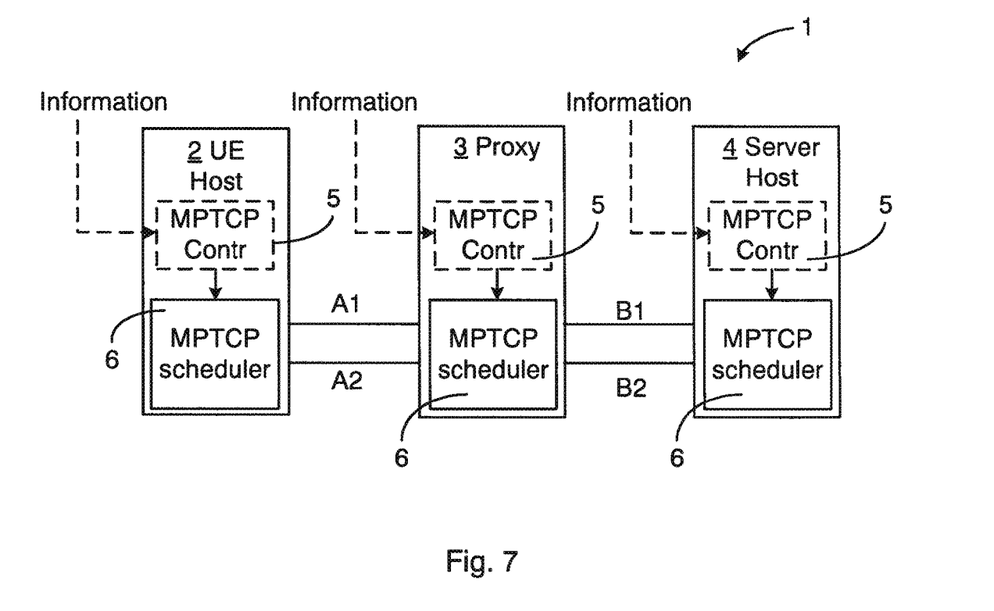
FIG. 7 illustrates a plurality of MPTCP capable devices that each have an MPTCP Controller in accordance with the present disclosure.

As shown in FIG. 7, an MPTCP Controller 5 is included in one or more MPTCP devices 2, 3 and 4 in a communication network 1. The MPTCP device can be i) an MPTCP enabled end user communication device (a.k.a., UE) 2 (i.e., a UE having an MPTCP protocol layer and two or more TCP/IP stacks), ii) an MPTCP-proxy 3 or iii) an MPTCP enabled server 4 (i.e., a server having an MPTCP protocol layer and one, two or more TCP/IP stacks, e.g. an application server). The UE 2 may be a radio device, mobile or stationary, enabled to communicate over a radio cannel in a communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). Alternatively, the MPTCP capable UE 2 may communicate via one or more wired accesses. It should be noted that the embodiments of the present disclosure may include wired access in addition to or instead of wireless accesses such as cellular 3GPP accesses and/or WLAN accesses. It should also be noted that 3GPP accesses are not limited to LTE standards, e.g. Wideband Code Division Multiple Access (WCDMA) and/or Global System for Mobile Communications (GSM) standards are also/alternatively possible.

The MPTCP Controller 5 is able to communicate with an external source and receive (and also send when feasible) the MPTCP usage information. This information may also/alternatively be received from another internal source (for example provided to the MPTCP device using signaling that is terminated in another protocol layer in the MPTCP device). This is further described below.

The MPTCP Controller 5 is also able to control the MPTCP scheduler 6 in the MPTCP device. The steering could be per application, for classes of applications, or for all applications. This includes how different applications use MPTCP and may consist of any combinations of the following (and the information is typically application specific and indicated as described herein):

a) Control establishment of MPTCP subflows indication
 a.1 This indication may be used to control if and how additional MPTCP subflows are to be established.
 a.2 This indication may also/alternatively be seen as a third variant of the below "MPTCP mode" indication i.e. "no MPTCP at all", or attempt to establish additional subflows first at special conditions, like when the main subflow starts deteriorating.

b) "MPTCP mode" indication
 b.1 "Seamless session continuity at mobility" mode
  i) In this mode, not all MPTCP subflows are used. An example is that a main MPTCP subflow over Wi-Fi is mainly used and a MPTCP subflow over 3GPP is in "standby/backup" mode and used only when the main subflow starts deteriorating.
  ii) This indication may also/alternatively be extended to cover the access that is to be used for the main MPTCP subflow. Typically, this is Wi-Fi but there may also exist scenarios in which it is preferred to indicate that the main subflow is over 3GPP.
 b.2 "Throughput aggregation" mode
  i) In this mode, all or some MPTCP subflows may be used for a specific application.
  ii) This indication may also/alternatively be extended to cover only a limited number of MPTCP subflows, for example in the case when there are three different subflows over different accesses (communication standards) then it is feasible to only indicate that throughput aggregation is to be used with two of the subflows.

c) Additional indications for the "throughput aggregation" mode
 c.1 These may be used to indicate, the "weight" (e.g. in "%") on how much the different accesses are used. For example, throughput aggregation may be divided like 70% over 3GPP and 30% over Wi-Fi.
 c.2 "Combined minimum rate" mode (one of several)
  i) In this mode, all or some MPTCP flows may be used for a specific application, depending on characteristics of subflows
  ii) Example: If throughput of one subflow exceeds threshold T, then limit the use of the other subflows (but allow performance probing traffic). If the subflow does not exceed threshold, then use "throughput aggregation" mode.)
 c.3 "Sequential throughput" mode
  i) In this mode, MPTCP may start to distribute all or the majority of the traffic to one sub-flow, potentially this subflow can be the subflow which experience the shortest round-trip-time (RTT).
  ii) Once this subflow has reached its maximum rate (e.g. when the TCP ramp up has finished), additional sub-flows may be used (possible also in sequence).
  iii) In this mode it is possible to avoid establishing subflows through some accesses when in those cases the TCP has ended before the maximum rate has been reached in another access.

Thus, in some embodiments of the present disclosure, the control signals from the controller 5 to the scheduler 6 in the MPTCP capable device may specify under which condition(s) and/or to what extent each sub-flow should be included in throughput aggregation.

Figure 8:
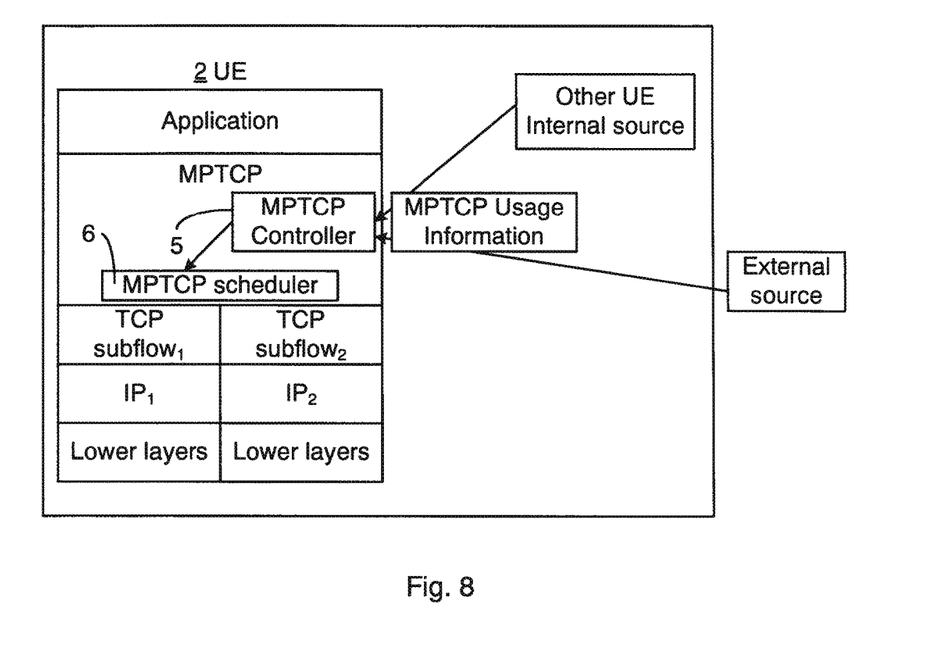
FIG. 8 illustrates MPTCP usage information being provided to an MPTCP Controller, in accordance with the present disclosure.

FIG. 8 shows as an example these functions in the UE 2 side where arrows indicate MPTCP usage information being signalled to the controller 5 in the MPTCP layer from an external source or from within the MPTCP capable device (here the UE 2).

Signaling of the MPTCP Usage Information

The signaling of the MPTCP usage information to the MPTCP Controller 5 may take different paths and a main principles may be as follows.

In a first principle, signaling is "out-band" in the sense that non-MPTCP protocols are used to convey the MPTCP usage information to the MPTCP Controller 5 of the MPTCP device. Examples of this case are ANDSF-based communication (extended DIDA) and other Over the Top (OTT) signaling mechanisms. Other examples are usage of 3GPP Network Access Stratum (NAS) such as EPS Mobility Management (EMM) protocol and signaling, and 3GPP Access Stratum (AS) signaling such as Radio Resource Control (RRC) protocol and signaling.

The ANDSF-case is typically about the MPTCP device being the end user device 2 and the ANDSF policies over the S14 interface is extended with MPTCP usage information e.g. for different applications. The ANDSF client in the end user device extracts the information and forwards it to the MPTCP Controller 5.

The other OTT-signaling mechanisms case is similar to the ANDSF-case and the difference is the protocol used is some other signaling protocol based on for example Hypertext Transfer Protocol Secure (HTTPS), Hypertext Transfer Protocol (HTTP), TCP/IP or User Datagram Protocol (UDP)/IP.

In the second principle, signaling is "in-band" between two MPTCP Controllers 5 of two MPTCP devices. This in-band signaling may be included as part of the MPTCP signaling (as MPTCP related TCP Options header fields or as other TCP Options header fields).

In this case, the MPTCP Controller 5 communicates with the MPTCP scheduler 6 and may have the ability to both indicate MPTCP usage information to be included in the MPTCP-signaling towards the other MPTCP device, and to receive MPTCP usage information from the MPTCP scheduler 6 or controller 5 that was included in the MPTCP signaling by the other MPTCP device.

Figure 9:
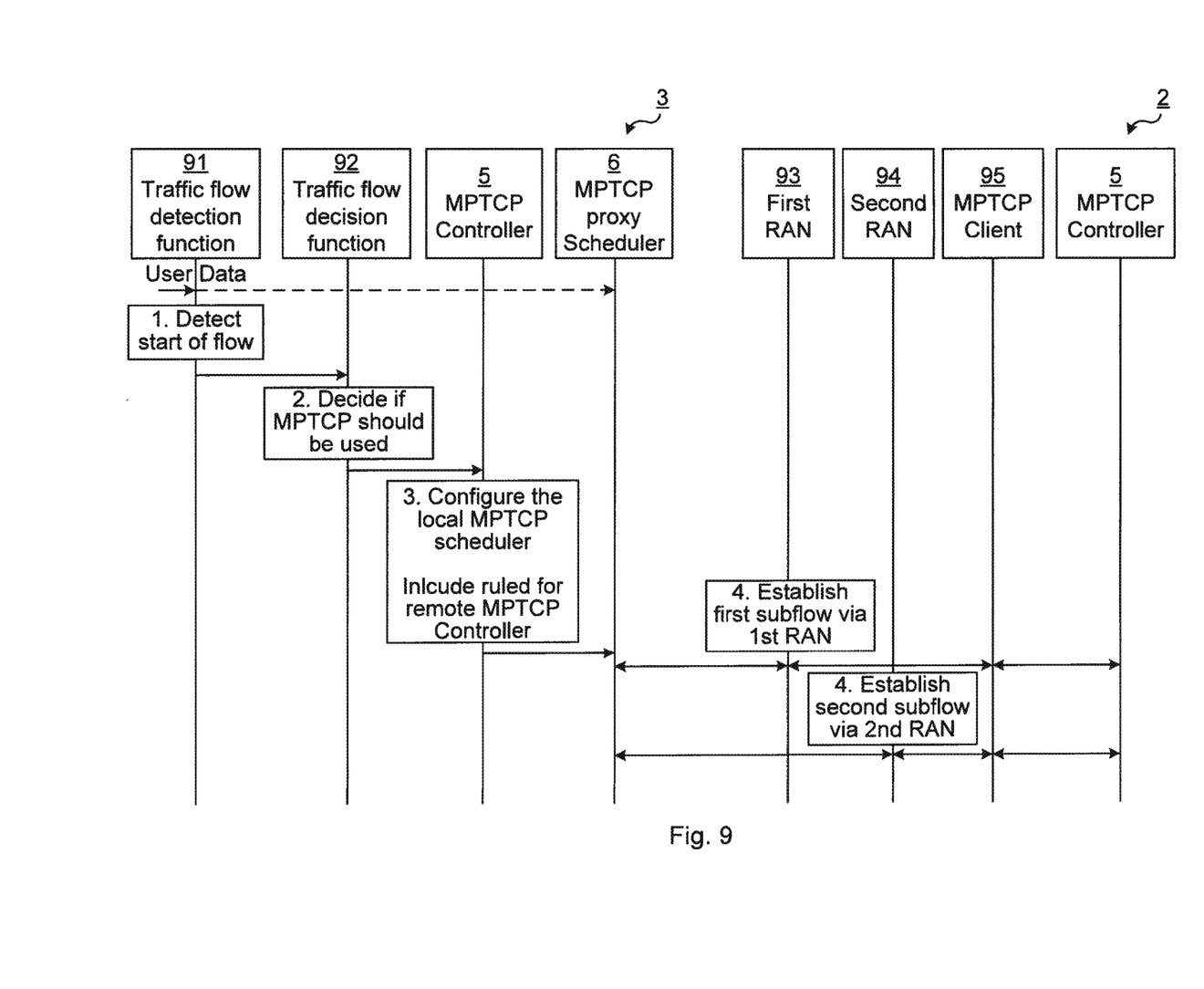
FIG. 9 illustrates a signaling diagram according to some embodiments of the present disclosure.

Referring now to FIG. 9, FIG. 9 shows an example message flow. For example, FIG. 9 shows an MPTCP controller 5 installed on an MPTCP proxy-server 3 receiving MPTCP usage information from a traffic flow decision function. Upon receiving the MPTCP usage information, the MPTCP controller 5 may control the MPTCP scheduler 6 of the MPTCP proxy-server 3. This control may for example be about when the first and second subflows over first and second radio access networks (RANs) 93 and 94 are established towards the MPTCP client 95. As another alternative, the MPTCP controller 5 on the MPTCP proxy-server 3 may send the MPTCP usage information to the MPTCP controller 5 on the MPTCP client 95 during the establishment of the first subflow via the first RAN 93. The MPTCP controller 5 may then use the received MPTCP usage information to for example control when the second subflow is established over the second RAN 94.

Identification of the Different Applications

The MPTCP usage information is in a typical case indicated per application (e.g., the MPTCP usage information may identify one or more applications/services). Therefore, there may be a need to identify the different applications in the MPTCP usage information.

This may be especially needed in the first principle described above (out-band) since in this case the signaling path is out-band and not related to any specific MPTCP connection. In the second principle (in-band), the MPTCP signaling may be associated with a specific MPTCP connection and therefore it may not be necessary to identify specific applications. The second principle may anyhow include the possibility that a specific MPTCP connection is used to signal MPTCP usage information also/alternatively for other MPTCP connections and in this case the different applications may also be identified.

The different applications may be identified by any of the following mechanisms:

ANDSF OS specific Application Identifier (OSAppId):

In this case the MPTCP usage information is indicated in the ANDSF policies for the different applications.

Traffic Flow Templates (TFTs):

In this case the MPTCP usage information is indicated in relation to for example source and destination IP addresses, source and destination TCP ports.

Fully Qualified Domain Names (FQDN):

In this case the MPTCP usage information is indicated in relation to the FQDNs for the different destination host names.

Extensions

The discussion above describes how the MPTCP usage information may be signaled for different applications per UE. The same principle may also/alternatively be lifted up so that the indication is on UE level, for example if a specific UE 2 shall only use the "Seamless session continuity at mobility" mode or whether "Throughput aggregation" mode is also allowed. Thus, the received MPTCP usage information may identify at least one UE 2 for the scheduling of which the usage information is relevant, typically when the device receiving the MPTCP information is a network server 3 or 4 and not the UE 2 in question.

Additional information that can be used by MPTCP Controller and MPTCP device

When generating the MPTCP usage information the MPTCP Controller 5 may take into considering additional information related to the MPTCP device. This additional information may e.g. include things like subscription information, service information, radio conditions of one or more of the radio accesses the devices is using, network/cell load where the MPTCP device is currently located etc. This information may be provided to the MPTCP Controller 5 from network nodes as well as reporting sent from at least one MPTCP device 2, 3 or 4. The reporting may be transmitted in the same way as the MPTCP usage information e.g. using ANDSF signaling, or MPTCP signaling.

Similarly, the MPTCP end points can consider such information when executing the control of the MPTCP traffic. The MPTCP usage information may contain instructions on what information should be considered and how it is allowed to affect the MPTCP control.

Figure 10A:
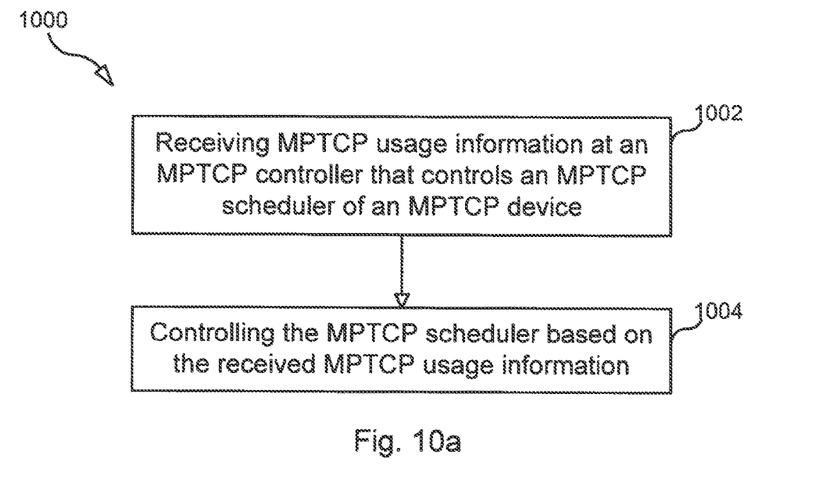
FIG. 10a is a flow chart illustrating an embodiment of a method of the present disclosure.

FIG. 10a is a flow chart illustrating a method 1000 performed by an MPTCP Controller 5 of an MPTCP device. Process 1000 begins in step 1002 where the MPTCP Controller receives MPTCP usage information. The MPTCP usage information may be received from an ANDSF. In step 1004, MPTCP Controller controls an MPTCP scheduler of the MPTCP device based on the received MPTCP usage information. Thus, the MPTCP controller 5 of an MPTCP capable device receives 1002 information signals comprising MPTCP usage information, from outside of the MPTCP capable device. Then, the controller 5 sends control signals to an MPTCP scheduler 6 of the MPTCP capable device for controlling 1004 said scheduler, the control signals being based on the received 1002 MPTCP usage information.

Figure 10B:
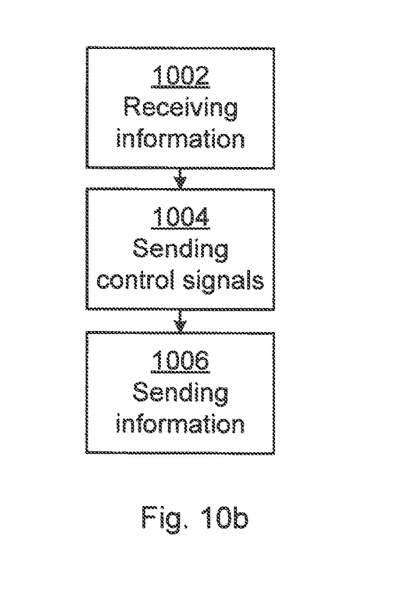
FIG. 10b is a flow chart illustrating another embodiment of a method of the present disclosure.

FIG. 10b is a flow chart illustrating another embodiment of the method 1000, in which the steps of receiving 1002 the MPTCP usage information and sending control signals to control 1004 the scheduler 6 are as in respect of FIG. 10a. In addition, the controller 5 sends 1006 information signals comprising MPTCP usage information to another MPTCP device, e.g. an MPTCP device engaged in MPTCP communication with the MPTCP capable device comprising the controller 5. The sent 1006 MPTCP usage information may be intended for a controller of that other MPTCP device. In some embodiments, the sent 1006 MPTCP usage information is based on information which is specific for the other MPTCP device to which the usage information is sent. Such specific information may e.g. relate to subscription information, service/application information, radio conditions of one or more of the radio accesses the other devices is using and/or network/cell load where the other MPTCP device is currently located.

Figure 11:
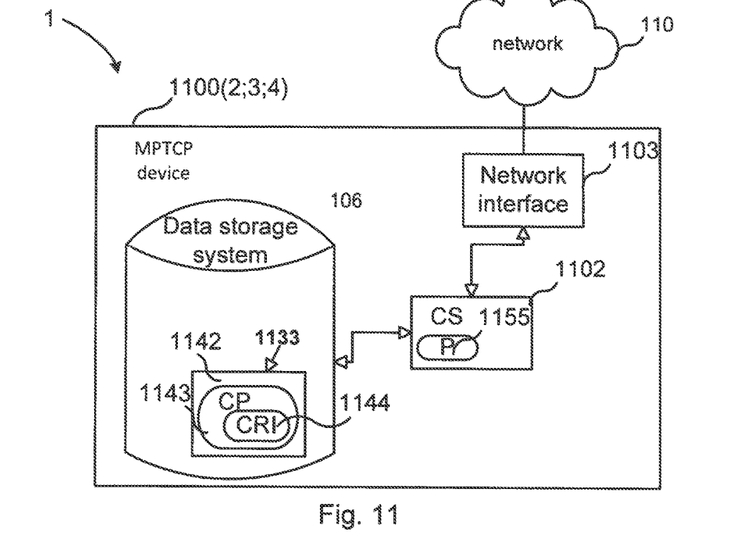
FIG. 11 is a block diagram of an embodiment of an MPTCP device of the present disclosure.

FIG. 11 is a block diagram of an embodiment of an MPTCP device 1100. As shown in FIG. 11, MPTCP device 1100 may include or consist of: a computer system (CS) 1102, which may include one or more processors 1155 (e.g., a general purpose microprocessor) and/or one or more circuits, such as an application specific integrated circuit (ASIC), field-programmable gate arrays (FPGAs), a logic circuit, and the like; a network interface 1103 for use in connecting MPTCP device 1100 to a network 110; and a data storage system 1106, which may include one or more non-volatile storage devices and/or one or more volatile storage devices (e.g., random access memory (RAM)). In embodiments where MPTCP device 1100 includes a processor 1155, a computer program product (CPP) 1133 may be provided. CPP 1133 includes or is a computer readable medium (CRM) 1142 storing a computer program (CP) 1143 comprising computer readable instructions (CRI) 1144. CRM 1142 may include a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1144 of computer program 1143 is configured such that when executed by computer system 1102, the CRI causes the MPTCP device 1100 to perform steps described above (e.g., steps described above with reference to the flow charts and message flows shown in the drawings). In other embodiments, MPTCP device 1100 may be configured to perform steps described herein without the need for a computer program. That is, for example, computer system 1102 may consist merely of one or more ASICs. Hence, the features of the embodiments described herein may be implemented in hardware and/or software. The MPTCP controller of the MPTCP device 1100, as discussed herein, may typically, provided that it is comprised in said device 1100, make use of and/or comprise at least parts of the processor circuitry 1155 and/or the data storage system/storage unit 1106, as well as any other part of the device 1100, for performing any embodiment of the method of the present disclosure.

Figure 12:
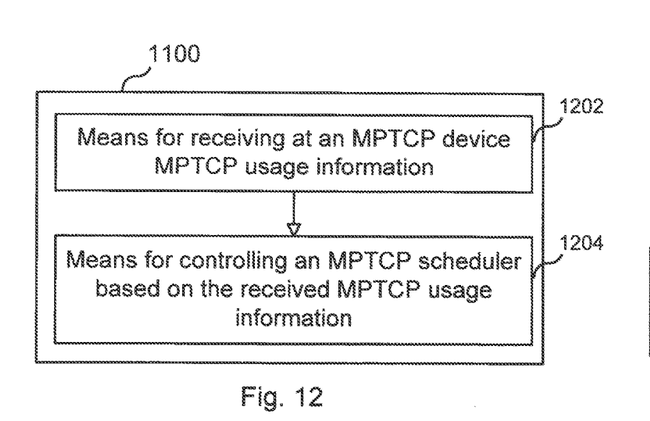
FIG. 12 is another block diagram of an embodiment of an MPTCP device of the present disclosure.

FIG. 12 is a functional block diagram of an MPTCP device 1100 according to some embodiments. In the embodiment shown, the MPTCP device 1100 comprises means 1202 (e.g., a network interface 1103) for receiving MPTCP usage information, and means 1204 (e.g., computer instructions executed by processor circuitry 1155) for controlling an MPTCP scheduler 6 based on the received 1002 MPTCP usage information.

Figure 13:
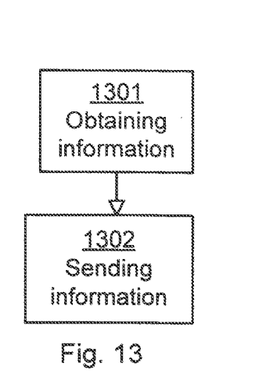
FIG. 13 is a flow chart illustrating another embodiment of a method of the present disclosure.

FIG. 13 is a schematic flow chart of another embodiment of the method of the present disclosure. The embodiment is performed by a network element in a communication network. The network element obtains 1301 MPTCP usage information for an MPTCP controller 5 of an MPTCP capable device 1100. The network element may e.g. retrieve the MPTCP usage information from a storage unit 1106 comprised therein, compute it by means of processor circuitry 1155 comprised therein and/or receive it from another network element e.g. via a network interface 1103 comprised therein. Then, the network element transmits 1302 information signals comprising the MPTCP usage information to the MPTCP capable device 1100 for enabling said MPTCP controller 5 to control an MPTCP scheduler 6 of the MPTCP capable device 1100 based on the MPTCP usage information. In some embodiments, the network element is comprised in another MPTCP device 1100, e.g. a UE 2, an MPTCP proxy 3, or an application server 4, and the information signals are transmitted in-band as part of MPTCP signalling with the MPTCP capable device 1100. In other embodiments, the network element is comprised in any other network node e.g. in an ANDSF server or an OTT server, and the information signals are transmitted out-band of any MPTCP signalling of the MPTCP capable device 1100, e.g. using a non-MPTCP communication protocol.

In some embodiments of the present disclosure, the control signals for controlling 1004 the MPTCP scheduler 6 are application specific, or are for all applications. Thus, the scheduler 6 may be controlled on a per application basis or the same scheduling principles relating to MPTCP may be used regardless of the application/service.

In some embodiments of the present disclosure, the control signals for controlling 1004 the MPTCP scheduler 6 comprises instructions about if and/or how different applications should be scheduled using MPTCP. For instance, in some embodiments, the control signals specify a condition when a new MPTCP sub-flow should be established. Additionally or alternatively, in some embodiments, the control signals specify that MPTCP shall be used for seamless session continuity at mobility. Alternatively, the control signals specify that MPTCP shall be used for throughput aggregation on all available, or on specified, sub-flows. In some embodiments, the control signals specify under which condition(s) and/or to what extent each sub-flow should be included in the throughput aggregation.

In some embodiments of the present disclosure, the received 1002 MPTCP usage information identifies at least one application for the scheduling of which the usage information is relevant. This may then allow the controller 5 to control 1004 the scheduler 6 on a per application basis.

In some embodiments of the present disclosure, the received 1002 MPTCP usage information identifies at least one UE 2 for the scheduling of which the usage information is relevant.

In some embodiments of the present disclosure, the received 1002 MPTCP usage information is signalled out-band, e.g. via OTT signalling or NAS signalling. Alternatively, in some other embodiments, the received 1002 MPTCP usage information is signalled in-band as part of MPTCP signalling with another MPTCP device 1100, e.g. in TCP Options header field(s).

In some embodiments of the present disclosure, the MPTCP capable device 1100 is, or is comprised in, a UE 2, an MPTCP proxy 3, or an application server 4.

In some embodiments of the present disclosure, the information signals are received 1002 over a radio interface, e.g. if the MPTCP capable device is a UE 2 or other mobile device. However, it is also contemplated that the information signals may in some other embodiments be received 1002 over a wired communication interface, e.g. if the MPTCP capable device is an MPTCP proxy 3 or an application server 4, or any other network node or element.

Below follow some other aspects and embodiments of the present disclosure.

According to an aspect of the present disclosure, there is provided an MPTCP controller 4 for an MPTCP capable device 1100. The controller comprises means 1202 (e.g. the processor circuitry 1155 in cooperation with the network interface 1103) for receiving 1002 information signals comprising MPTCP usage information, from outside of the device 1100. The controller 4 also comprises means 1204 (e.g. the processor circuitry 1155) for sending control signals to an MPTCP scheduler 6 of the device 1100 for controlling 1004 said scheduler 6, the control signals being based on the received 1002 usage information.

According to another aspect of the present disclosure, there is provided a network element for a communication network, the element comprising means (e.g. the processor circuitry 1155, possibly in cooperation with the network interface 1103 and/or the storage unit 1106) for obtaining 1301 MPTCP usage information for an MPTCP controller 5 of an MPTCP capable device 1100. The element also comprises means (e.g. the processor circuitry 1155 in cooperation with the network interface 1103) for transmitting information signals comprising the MPTCP usage information to the MPTCP capable device 1100 for enabling said MPTCP controller 5 to control an MPTCP scheduler 6 of the MPTCP capable device 1100 based on the MPTCP usage information.

According to another aspect of the present disclosure, there is provided a method for controlling usage of MPTCP. The method comprises an MPTCP controller 5 of an MPTCP device 1100 receiving 1002 MPTCP usage information. The method also comprises the MPTCP controller 5 controlling 1004 an MPTCP scheduler 6 based on said received 1002 MPTCP usage information.

According to some embodiments, the MPTCP controller 5 receives 1002 the MPTCP usage information from an ANDSF.

According to some embodiments, the MPTCP scheduler 6 runs on the MPTCP device 1100.

According to some embodiments the MPTCP device 1100 is one of: i) an MPTCP end user device or UE 2 and ii) an MPTCP server. In some embodiments the MPTCP device 1100 is an MPTCP proxy-server 3, and in some other embodiments the MPTCP device 1100 is an application server 4.

According to some embodiments, the MPTCP usage information is signaled out of-band to the MPTCP controller 5.

According to some embodiments, the MPTCP usage information is provided 1002 to the MPTCP controller 5 using a non-MPTCP protocol. In some embodiments, the MPTCP usage information is provided to the MPTCP device 1100 in an ANDSF message. In some embodiments, an ANDSF client running on the MPTCP device 1100 receives the ANDSF message containing the MPTCP usage information and provides 1002 the MPTCP usage information to the MPTCP controller 5.

According to some embodiments, the MPTCP usage information is signaled in band to the MPTCP controller. In some embodiments, the MPTCP usage information is included in a TCP Options field of a TCP header that is transmitted 1002 to the MPTCP controller 5.

According to some embodiments, the MPTCP usage information comprises an ANDSF OS specific Application Identifier.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed by a controller of a multi-path transmission control protocol (MPTCP) capable device, the method comprising:
   receiving a first message transmitted by a transmitter located away from the device, wherein the first message comprises first MPTCP usage information comprising: i) a first application identifier identifying a first application and ii) MPTCP mode information indicating a set of one or more MPTCP modes available to the first application;
   controlling an MPTCP service provided to the first application in accordance with the set of MPTCP modes available to the first application;
   after receiving the first message, receiving a second message transmitted by the transmitter located away from the device, wherein the second message comprises second MPTCP usage information comprising: i) the first application identifier identifying the first application and ii) revised MPTCP mode information for the first application; and
   after receiving the second message, controlling an MPTCP service provided to the first application in accordance with the revised MPTCP mode information, wherein
   the MPTCP mode information indicates that the set of one or more MPTCP modes available to the first application consists solely of a seamless session continuity at mobility MPTCP mode,
   the revised MPTCP mode information indicates that a throughput aggregation mode is now available for the first application,
   the revised MPTCP mode information comprises a first weight value associated with a first path and a second weight value associated with a second path, and
   controlling an MPTCP service provided to the first application in accordance with the revised MPTCP mode information comprises limiting the amount of traffic sent via the first path based on the first weight value and limiting the amount of traffic sent via the second path based on the second weight value.

2. The method of claim 1, further comprising:
   receiving a second message transmitted by a transmitter located away from the device, wherein the second message comprises second MPTCP usage information comprising: i) a second application identifier identifying a second application and ii) MPTCP mode information indicating a set of one or more MPTCP modes available to the second application; and
   controlling an MPTCP service provided to the second application in accordance with the set of MPTCP modes available to the second application, wherein the second application is different than the first application.

3. A method performed by a controller of a multi-path transmission control protocol (MPTCP) capable device, the method comprising:
   receiving a first message transmitted by a transmitter located away from the device, wherein the first message comprises first MPTCP usage information comprising: i) a first application identifier identifying a first application and ii) first MPTCP mode information indicating a first set of one or more MPTCP modes available to the first application; and
   controlling an MPTCP service provided to the first application in accordance with the first set of MPTCP modes available to the first application, wherein
   the first MPTCP usage information further comprises an establishment indicator specifying one or more conditions under which an MPTCP subflow should be established for the identified first application,
   the first MPTCP mode information indicates that a throughput aggregation mode is available for the first application,
   the first MPTCP usage information further comprises a first weight value associated with a first path and a second weight value associated with a second path, and
   controlling the MPTCP service comprises limiting the amount of traffic sent via the first path based on the first weight value and limiting the amount of traffic sent via the second path based on the second weight value.

4. The method of claim 1, wherein the first application identifier is one of: i) an Access network discovery and selection function (ANDSF) identifier, ii) fully qualified domain name, and iii) a traffic flow template.

5. The method of claim 3, wherein the first set of MPTCP modes available to the first application specifies that MPTCP shall be used for seamless session continuity at mobility and for throughput aggregation.

6. The method of claim 5, wherein the first MPTCP usage information specifies a condition under which a sub-flow should be included in the throughput aggregation.

7. The method of claim 1, wherein the received first MPTCP usage information is signalled out-band via over-the-top (OTT) signalling or non-access stratum (NAS) signalling.

8. The method of claim 1, wherein the received first MPTCP usage information is signalled in-band as part of MPTCP signalling with another MPTCP device.

9. The method of claim 1, further comprising:
   sending information signals comprising MPTCP usage information to another MPTCP device.

10. The method of claim 9, wherein the sent MPTCP usage information is based on information specific for the other MPTCP device to which the usage information is sent.

11. The method of claim 1, wherein the MPTCP capable device is a UE, an MPTCP proxy, or an application server.

12. The method claim 1, wherein the information signals are received over a radio interface.

13. A multi-path transmission control protocol (MPTCP) controller for an MPTCP capable device, the controller comprising:
   processor circuitry; and
   a storage unit storing instructions executable by said processor circuitry whereby said MPTCP controller is operative to:
   receive a first message transmitted by a transmitter located away from the device, wherein the first message comprises first MPTCP usage information comprising: i) a first application identifier identifying a first application and ii) first MPTCP mode information indicating a first set of one or more MPTCP modes available to the first application;
control an MPTCP service provided to the first application in accordance with the first set of MPTCP modes available to the first application;
after receiving the first message, receive a second message transmitted by the transmitter located away from the device, wherein the second message comprises second MPTCP usage information comprising: i) the first application identifier identifying the first application and ii) revised MPTCP mode information for the first application; and
after receiving the second message, control an MPTCP service provided to the first application in accordance with the revised MPTCP mode information, wherein
the first MPTCP mode information indicates that the set of one or more MPTCP modes available to the first application consists solely of a seamless session continuity at mobility MPTCP mode,
the revised MPTCP mode information indicates that a throughput aggregation mode is now available for the first application,
the revised MPTCP mode information comprises a first weight value associated with a first path and a second weight value associated with a second path, and
controlling an MPTCP service provided to the first application in accordance with the revised MPTCP mode information comprises limiting the amount of traffic sent via the first path based on the first weight value and limiting the amount of traffic sent via the second path based on the second weight value.

14. A UE comprising:
the MPTCP controller of claim 13; and
an MPTCP scheduler.

15. An MPTCP proxy comprising:
the MPTCP controller of claim 13; and
an MPTCP scheduler.

16. An application server comprising:
the MPTCP controller of claim 13; and
an MPTCP scheduler.

17. A method performed by a network element in a communication network, the method comprising:
obtaining first multi-path transmission control protocol (MPTCP) usage information for enabling an MPTCP controller of an MPTCP capable device to control an MPTCP scheduler of the MPTCP capable device based on the first MPTCP usage information;
transmitting to the MPTCP capable device a first message comprising the first MPTCP usage information;
after obtaining the first MPTCP usage information, obtaining second MPTCP usage information;
after obtaining the second MPTCP usage information, transmitting to the MPTCP capable device a second message comprising the second MPTCP usage information, wherein
the first MPTCP usage information comprises: i) an application identifier identifying an application and ii) MPTCP mode information indicating a set of one or more MPTCP modes available to the identified application,
the MPTCP mode information indicates that the set of one or more MPTCP modes available to the identified application consists solely of a seamless session continuity at mobility MPTCP mode,
the second MPTCP usage information comprises: i) the application identifier identifying the application and ii) revised MPTCP mode information indicating a different set of one or more MPTCP modes available to the identified application,
the revised MPTCP mode information indicates that a throughput aggregation mode is now available for the identified application, and
the revised MPTCP mode information is for causing the MPTCP capable device to control an MPTCP service provided to the identified application by limiting the amount of traffic sent via the first path based on a first weight value included in the revised MPTCP mode information and limiting the amount of traffic sent via a second path based on a second weight value included in the revised MPTCP mode information.

18. The method of claim 17, wherein the network element is comprised in another MPTCP device.

19. The method of claim 17, wherein the network element is comprised in an ANDSF server or an OTT server, and wherein the message is transmitted out-band of any MPTCP signalling of the MPTCP capable device.

20. A network element for a communication network, the element comprising:
processor circuitry; and
a storage unit storing instructions executable by said processor circuitry whereby said network element is operative to:
obtain first multi-path transmission control protocol (MPTCP) usage information for enabling an MPTCP controller of an MPTCP capable device to control an MPTCP scheduler of the MPTCP capable device based on the first MPTCP usage information;
transmit to the MPTCP capable device a first message comprising the first MPTCP usage information;
after obtaining the first MPTCP usage information, obtain second MPTCP usage information;
after obtaining the second MPTCP usage information, transmit to the MPTCP capable device a second message comprising the second MPTCP usage information, wherein
the MPTCP usage information comprises: i) an application identifier identifying an application and ii) MPTCP mode information indicating a set of one or more MPTCP modes available to the identified application,
the MPTCP mode information indicates that the set of one or more MPTCP modes available to the identified application consists solely of a seamless session continuity at mobility MPTCP mode,
the second MPTCP usage information comprises: i) the application identifier identifying the application and ii) revised MPTCP mode information indicating a different set of one or more MPTCP modes available to the identified application,
the revised MPTCP mode information indicates that a throughput aggregation mode is now available for the identified application, and
the revised MPTCP mode information is for causing the MPTCP capable device to control an MPTCP service provided to the identified application by limiting the amount of traffic sent via the first path based on a first weight value included in the revised MPTCP mode information and limiting the amount of traffic sent via a second path based on a second weight value included in the revised MPTCP mode information.

21. A computer program product comprising a non-transitory computer readable medium storing instructions for:

processing a first message transmitted by a remote transmitter, said first message comprising first multi-path transmission control protocol (MPTCP) usage information comprising: i) an application identifier identifying an application and ii) a first MPTCP mode indicator indicating a first set of one or more MPTCP modes available to the identified application;

controlling an MPTCP service provided to the identified application in accordance with the MPTCP mode indicator;

after processing the first message, processing a second message transmitted by the remote transmitter, wherein the second message comprises second MPTCP usage information comprising: i) the application identifier identifying the application and ii) a second MPTCP mode indicator indicating a second set of one or more MPTCP modes available to the identified application; and after receiving the second message, controlling an MPTCP service provided to the first application in accordance with the second MPTCP mode indicator, wherein the first MPTCP mode indicator indicates that the first set of one or more MPTCP modes available to the identified application consists solely of a seamless session continuity at mobility MPTCP mode, the second MPTCP mode indicator indicates that a throughput aggregation mode is now available for the first application, the second MPTCP mode indicator comprises a first weight value associated with a first path and a second weight value associated with a second path, and controlling an MPTCP service provided to the identified application in accordance with the second MPTCP mode indicator comprises limiting the amount of traffic sent via the first path based on the first weight value and limiting the amount of traffic sent via the second path based on the second weight value.

22. The method of claim 3, wherein controlling the MPTCP service comprises:
    initially using only a first subflow to transmit traffic generated by the first application;
    determining whether the first subflow has reached its maximum rate; and
    as a result of determining that first subflow has reached its maximum rate, using both of the first subflow and a second subflow to transmit traffic generated by the first application.

23. A method performed by a controller of a multi-path transmission control protocol (MPTCP) capable device, the method comprising:
    receiving a first message transmitted by a transmitter located away from the device, wherein the first message comprises first MPTCP usage information comprising: i) a first application identifier identifying a first application and ii) first MPTCP mode information indicating a first set of one or more MPTCP modes available to the first application; and
    controlling an MPTCP service provided to the first application in accordance with the first set of MPTCP modes available to the first application, wherein
    the first MPTCP mode information indicates that a throughput aggregation mode is available for the application,
    the first MPTCP usage information further comprises a first weight value associated with a first path and a second weight value associated with a second path, and
    controlling the MPTCP service comprises limiting the amount of traffic sent via the first path based on the first weight value and limiting the amount of traffic sent via the second path based on the second weight value.

* * * * *